United States Patent [19]

Strader

[11] 3,908,298
[45] Sept. 30, 1975

[54] FISHING LURE

[76] Inventor: James W. Strader, P.O. Box 4029, Tallahassee, Fla. 32303

[22] Filed: Sept. 30, 1974

[21] Appl. No.: 510,815

Related U.S. Application Data

[63] Continuation of Ser. No. 362,067, May 21, 1973, abandoned, and Ser. No. 196,850, Nov. 8, 1971, abandoned.

[52] U.S. Cl. ............ 43/42.05; 43/42.31; 43/42.39; 43/42.41
[51] Int. Cl.² ......................................... A01K 85/00
[58] Field of Search............ 43/42.11, 42.05, 42.31, 43/42.39, 42.41, 41.2

[56] References Cited
UNITED STATES PATENTS

| | | | |
|---|---|---|---|
| 2,625,767 | 1/1953 | Pokras | 43/42.05 |
| 2,741,864 | 4/1956 | Shotton | 43/42.31 |
| 2,794,288 | 6/1957 | Marshall et al. | 43/42.11 |
| 3,012,356 | 12/1961 | Tyson | 42/42.11 |
| 3,388,495 | 6/1968 | Minser | 43/42.05 |

*Primary Examiner*—Melvin D. Rein

[57] ABSTRACT

A fishing lure having a generally conical shaped body with a fishing line conduit passing through the body to allow the lure to move freely up and down the fishing line, the radii of the outer shell of the lure decreases in size from the rear of the shell toward the forward end of the shell to streamline the lure for movement through the water. The body of the lure has a generally cup shaped rear portion to protect bait on a hook attached to the distal end of the fishing line passing through the body of the lure. A sound chamber is included in the body of the lure that produces sound when at least one weight in the chamber moves against the body of the lure. Contained within a preferred embodiment of the lure is a generally cone shaped weight with a small end that may protrude through the line opening in the forward end of the body to separate weeds and moss.

4 Claims, 7 Drawing Figures

JAMES W. STRADER
INVENTOR.

BY Eugene P. Palin
ATTORNEY

FISHING LURE

This is a continuation of application Ser. No. 362,067, filed May 21, 1973 and Ser. No. 196,850, filed Nov. 8, 1971, both now abandoned.

BACKGROUND OF THE INVENTION

This invention relates in general to fishing lures and more particularly, to a new and improved combination of a sinker, weed separator, bait protector and sound chamber. The particular lures, illustrated and described in this specification are especially successful in fresh water fishing. I do not wish to be limited to a lure for fresh water fishing because the new and novel details of my fishing lure may be applied to brackish and salt water as well as fresh water fishing.

In the past, line sliding weights have been used in the fishing art for many years. Also the use of noisemakers within the body of a fishing lure to produce a noise when the lure is moved is also old in the art.

SUMMARY OF THE INVENTION

The fishing lures described herein include a body with a fishing line conduit passing through the body to allow the lure to move freely up and down the fishing line, an outer shell of decreasing radii toward the forward end of the body to separate weeds, a bait protector at the aft end of the lure; a sound chamber, and a sinker means that is freely moveable with the sound chamber. As the lure body moves back and forth, the sinker or sound making device engages the body making a clicking or clapping sound. The bait protector is cup shaped to protect at least the head of the bait on a hook attached to the end of a fishing line that passes through the lure. The body of the cup shaped protector also acts as a sound chamber for the sound making sinker means. Also, reflecting eyes may be attached to the lure to flash when the lure is moved through the water to attract fish. The noise making chamber and the noise making device provide noise simultaneously with the flashing light reflecting eyes. The noise stops when the lure comes to a rest in the water. The cup shaped flange at the rear of the lure imparts a special action to the movement of the lure, and in one embodiment the sinker protrudes out of the forward end of the lure to provide added weed and moss separation.

The primary object of my invention is to provide a bait protecting lure that will produce a noise from the noise chamber to attract fish, will act as a sinker and will separate weeds.

A further object of my invention is to provide a bait protecting lure with a cup shape rear portion to shield the bait adjacent the eye of a fish hook from weeds.

Another object of this invention is to provide a combination noise maker and a cup shaped bait protector with the cup shaped portion acting as an amplifying means.

An additional object of this invention is to provide a cone shaped sinker that may protrude out of the line opening in the front of the lure to provide a more effective weed and moss separator.

DESCRIPTION OF THE PREFERRED EMBODIMENT

Figure 1:
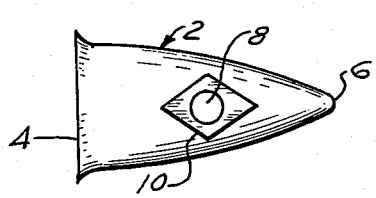
FIG. 1 is a side view of the fishing lure body.

Reference is made to FIG. 1 of the drawing in which fishing lure body 2 has an elongated body with an outer shell of decreasing radii toward the forward end of the body. The fishing line passes through the back 4 of the lure 2 and out of the front 6 of the lure 2. A light reflector, as shown at 8, is attached to the lure 2. Included inside the lure is a noise chamber and a weight or sinker, as shown in FIGS. 2, 3, 4 and 5. A cup shaped bait protector is located at the rear portion of the lure.

On each side of body 2 near the front end thereof is a raised eye member 10 shown here as being diamond shaped. In the center of each eye member 10 is a circular eye 8 which is painted with a suitable light reflecting paint. Glass reflective eyes may also be attached to member 10.

Figure 2:
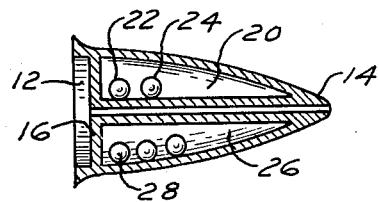
FIG. 2 is a cross-sectional side view of one embodiment of the fishing lure body with a plurality of round weights.

Referring now to FIG. 2, the aft end of the lure is cup shaped, as shown at 12. When a fishing line is passed through the line conduit 14 and the hook eye at the distal end of the line is placed in contact with wall 16, the cup and side wall 18 will protect the head of the worm or other bait on the hook from being torn off by weeds. The weed protector 12 may also keep weeds away from the point of a small hook.

The body portion has a sound making cavity 20 in the upper portion of the lure. The cup shaped weed protector also provides a sounding board for the sound chamber 20. The cavity 20 includes two balls 22 and 24. Cavity 20 may be designed so that the balls 22 and 24 come to rest quickly when the lure is brought to rest. When the balls are set in motion, they will make a clicking or clapping sound when they hit one another.

A lower weight chamber 26 may include one or more weights 28 to carry a baited hook to a desired depth below the surface of the water.

Figure 3:
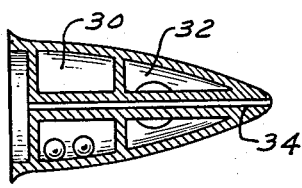
FIG. 3 is a cross-sectional side view of another embodiment of the fishing lure body with two weight chambers.

Another embodiment of the lure, as shown in FIG. 3, shows the sound cavity 30 rearward of the weight chamber 32. Both the sound cavity 30 and the weight chamber surround the line conduit 34.

Figure 4:
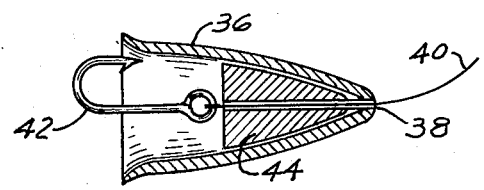
FIG. 4 is a cross-sectional side view of another embodiment of the fishing lure body with a generally cone shaped sinker.

Another embodiment of the lure body, as shown in FIG. 4, shows a hollow body portion 36 with an opening 38 for fishing line 40 to pass through. One end of the line is connected to fishing hook 42 and the other end is connnected to a fishing pole, not shown. Between the hook 42 and the body portion 36 is a generally conical shaped weight 44 that is freely moveable over the line 40. As the weight 44 moves against the body portion 36, it acts as a noise making device.

Figure 5:
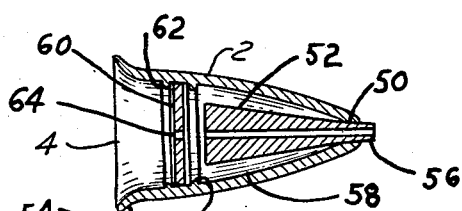
FIG. 5 is a cross-sectional side view of another embodiment of the fishing lure with a generally cone shaped sinker protruding out of the front of the lure.
Figure 6:
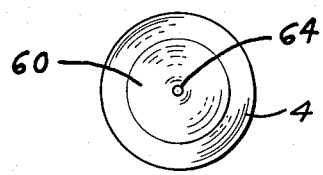
FIG. 6 is a rear view of the lure shown in FIG. 5.
Figure 7:
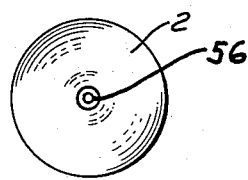
FIG. 7 is a front view of the lure shown in FIG. 5.

The fishing lure shown in FIGS. 5, 6 and 7 comprised of a hollow body 2 of decreasing radii toward the forward end of the body. The body has a small forward opening 50 in the body through which a pointed combination weed separator and sliding weight 52 may protrude. The rear of the body has a cup shaped flange 54 at the rear portion which serves to impart a special moving action to the total lure. The flange 54 also serves to protect bait on a hook by accepting and encasing the head of that bait as shown in FIG. 4. The lead weight 52 has a small forward end so that it may protrude through the hole 50 in the body 2 to present a sharp point 56 forward of the hole 50 in the body. The sharp point acts as a weed and moss separator so that all of the following components of the lure follow without weed interference. The lead weight 52 also contains a conduit through which the fishing line may pass freely. The fishing line in the weight in the sound chamber first acts as a longitudinal bearing to keep the line straight within the outer body, acts as a type of clapper to strike the weight against the inner wall 58 of the chamber to produce a fish attracting noise, and provides additional mass to cause the entire bait to sink to the desired depth before the lure is retrieved. The mass of this weight may be varied to increase or decrease the rate of sink.

This weed separator, line bearing, clapper, sinker is secured inside the outer shell by means of a circular disc 60 which is forced under pressure past raised flange 62 on the inside body of the outer shell until it rests between flange 62 and forward raised flange 64 on the inside of the outer shell.

The disc is locked in the outer shell in a perpendicular position to prevent the escape of the inner weed separator, line bearing, clapper, sinker 52. The weed separator, line bearing, clapper, sinker 52 is confined within the chamber in such a manner as to be loose enough to act as a clapper and strike the inner walls of the outer shell so as to produce a fish attracting sound. The disc 60 also has a circular hole 64 in the center of the disc to allow the line to pass freely through the entire lure.

The primary purpose of this embodiment of the invention is to provide a combination sinker, weed separator, bait protector, and sound chamber within one unit that also imparts a special action to the bait by means of the rear flange or circular water deflecting plane, and through which the line moves freely to allow a fish to run out the line without feeling any lure resistance. Also, the rear cup is so shaped that the head of any standard plastic worm is accepted and covered to prevent its being caught and pulled off the hook by weeds, moss and other obstructions, thus preventing loss of plastic worms.

In operation, the line sliding lure 2 or 36 is connected to the fishing line to protect bait on a hook at the end of the fishing line from weeds or other obstructions. The sound making devices cause a clicking, clapping or rattling sound. The sinker in or adjacent the lure will lower the hook to the proper depth below the surface of the water. The body of the lure separates some weeds from the bait, and as shown in FIG. 5 the pointed weight acts to provide a weed and moss separator. When a fish bites on the hook, the fish can move away from the lure because the fishing line will run free through the lure.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing lure including the combination of a bait protector and noise maker comprising;
a generally conical body member, said conical body member having a bait protector portion in the rear thereof for protecting bait on the shank of a hook adjacent the hook eye, a generally central line conduit in the anterior portion of said conical body member which is designed to accommodate the fishing line in slidable relationship,
a noise making weight means, said weight means shaped to be disposed within said conical body member and movable on the line when the line in the anterior portion of the conical body member is moved relative to said conical body member, said weight means lowering the lure when in the water and makes a clacking noise when moved into and out of contact with said conical body member, and
said bait protector portion sized and shaped to receive the eye and portion of the shank of a hook when connected to the line and to protect the bait placed over the shank of the hook adjacent the eye of the hook, whereby said end of the bait is not torn off the hook when the lure and hook is moved through an aquatic weed area.

2. A fishing lure as set forth in claim 1 wherein,
the conical body member is provided with a disc shaped member having a central line guide opening therein, said disc shaped member being adapted to be received within a circular recess on the inner wall of said conical body member adjacent the bait protector portion.

3. A fishing lure as set forth in claim 2 wherein,
said bait protection portion is provided with a rearwardly and outwardly directed flange which functions as a water and weed deflecting element.

4. A fishing line as set forth in claim 1 wherein,
said anterior portion of said weight means has a generally pointed forward end and with a central line guide opening.

* * * * *